(12) United States Patent
Murakami

(10) Patent No.: US 8,731,375 B2
(45) Date of Patent: May 20, 2014

(54) RECORDING APPARATUS

(75) Inventor: Naoyuki Murakami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 98 days.

(21) Appl. No.: 13/182,601

(22) Filed: Jul. 14, 2011

(65) Prior Publication Data

US 2012/0033939 A1 Feb. 9, 2012

(30) Foreign Application Priority Data

Aug. 5, 2010 (JP) .................................. 2010-176237

(51) Int. Cl.
*H04N 5/76* (2006.01)
(52) U.S. Cl.
USPC ......................................................... 386/291
(58) Field of Classification Search
USPC ........................... 386/291, 292, 295, 296, 326
See application file for complete search history.

(56) References Cited

U.S. PATENT DOCUMENTS

| | | | |
|---|---|---|---|
| 2003/0142953 A1* | 7/2003 | Terada et al. | 386/46 |
| 2005/0271365 A1* | 12/2005 | Hisatomi | 386/94 |
| 2009/0162030 A1* | 6/2009 | Kogusuri | 386/117 |

FOREIGN PATENT DOCUMENTS

| | | |
|---|---|---|
| JP | 2004171113 A | 6/2004 |
| JP | 2005251344 A | 9/2005 |
| JP | 2006246422 A | 9/2006 |
| JP | 2007281972 A | 10/2007 |
| JP | 2007-288557 | 11/2007 |

* cited by examiner

*Primary Examiner* — Tat Chio
(74) *Attorney, Agent, or Firm* — Cowan, Liebowitz & Latman, P.C.

(57) ABSTRACT

In a recording mode for simultaneously recording moving image files onto a plurality of recording mediums, a recording apparatus adds same identification information to the respective moving image files to be simultaneously recorded onto the plurality of recording mediums and record the obtained files in such a manner that when a recording space capacity of one of the plurality of recording mediums is smaller than a predetermined value or when there is an instruction to stop the recording to a designated recording medium among the plurality of recording mediums, the respective moving image files which are being recorded onto the plurality of recording are closed.

7 Claims, 11 Drawing Sheets

RECORDING APPARATUS

BACKGROUND OF THE INVENTION

1. Field of the Invention

The present invention relates to a recording apparatus and, more particularly, to a recording apparatus which can record data onto a plurality of recording mediums.

2. Description of the Related Art

Hitherto, a recording apparatus for recording a moving image signal and an audio signal onto a recording medium has been known. Among such a type of recording apparatus, there exists an apparatus which can record a moving image signal onto a plurality of recording mediums. For example, a hard disk recorder having a built-in hard disk (HDD) of a large capacity and a digital versatile disc (DVD) drive is disclosed as a home-use DVD recorder in the Japanese Patent Application Laid-Open No. 2007-288557. The hard disk recorder disclosed in the above Patent Document 1 has a function for copying the moving image signal and audio signal such as a television program or the like which has once been recorded in the HDD, to a DVD loaded in the DVD drive.

In a broadcasting spot or the like, as compared with photographing in our daily life, a very high reliability is needed to the recorded moving image signal. For this purpose, in a business-use video camera, there is a camera having a function for simultaneously recording the same moving image signal onto a plurality of recording mediums. By recording the same moving image signal onto a plurality of recording mediums as mentioned above, even if the moving image signal recorded on one or some of the recording mediums is not correctly reproduced or even if one or some of the recording mediums is lost, the same moving image can be reproduced from another recording medium.

In the case where the same moving image is simultaneously recorded onto a plurality of recording mediums as mentioned above, in order to search for the moving image which is simultaneously recorded onto each recording medium, the user needs to reproduce each moving image, so that it is very troublesome.

Therefore, a method whereby identification information is added to the moving image and the obtained moving image is recorded simultaneously recorded onto the two recording mediums is considered. However, there is a case where a recording space capacity of one of the two recording mediums runs out earlier than that of the other during the simultaneous-recording. In such a case, a method whereby the recording is stopped to the recording medium whose recording space capacity runs out and the recording is continued as it is to the recording medium which still has a recording space capacity is considered.

In the case where the recording to one recording medium is stopped during the simultaneous-recording as mentioned above, even in the case of the moving images which are simultaneously recorded onto a plurality of recording mediums, contents of the recorded moving images differ. There is, consequently, such a problem that even in the moving images to which the same identification information is added, their contents differ.

Therefore, even in the moving images to which the same identification information is added, the user needs to confirm whether or not their contents are identical.

In the case where the video camera is used as a business-use camera, there is such a use that after the moving image signal is simultaneously recorded onto a plurality of recording mediums, one of the recording mediums is handed to an editor in order to perform an edition and other recording mediums are kept at hand. In such a case, if one of the two recording mediums on which the moving images to which the same identification information is added are recorded is handed to the editor, there is a fear that the contents of the recorded images differ from one another.

SUMMARY OF THE INVENTION

In consideration of the foregoing problems, it is an aspect of the invention to enable moving image files which have same contents and are simultaneously recorded onto a plurality of recording mediums to be easily and accurately confirmed.

To accomplish the object of the invention, there is provided a recording apparatus having an input unit configured to input moving image data and a recording unit configured to record the moving image data input by the input unit as moving image files onto a plurality of recording mediums, comprising: a generating unit configured to generate identification information of the moving image files; and a control unit configured to control the recording unit in such a manner that, in a recording mode in which the recording unit simultaneously records the moving image files including the moving image data input by the input unit onto the plurality of recording mediums, the same identification information is added to the respective moving image files to be simultaneously recorded onto the plurality of recording mediums, wherein in the recording mode, if it is detected that a recording space capacity of one of the plurality of recording mediums is smaller than a predetermined threshold value, then the control unit controls the recording unit to close the respective moving image files which are being recorded onto the plurality of recording mediums, respectively.

According to another aspect of the invention, the control unit further controls the recording unit in such a manner that, in the recording mode, the recording of the moving image data to the recording medium whose recording space capacity is smaller than the predetermined threshold value is stopped, a new moving image file is opened to the recording mediums other than the recording medium whose recording space capacity is smaller than the predetermined threshold value, identification information of a value different from that of the identification information of the closed file is added to the new moving image file, and the recording of the new moving image file is continued to the other recording mediums.

Further, according to still another aspect of the invention, there is provided a recording apparatus having an input unit configured to input moving image data and a recording unit configured to record the moving image data input by the input unit as moving image files onto a plurality of recording mediums, comprising: a generating unit configured to generate identification information of the moving image files; and a control unit configured to control the recording unit in such a manner that, in a recording mode in which the recording unit simultaneously records the moving image files including the moving image data input by the input unit onto the plurality of recording mediums, the identification information having a same value is added to the respective moving image files to be simultaneously recorded onto the plurality of recording mediums and the obtained moving image files are recorded, wherein the control unit controls the recording unit in the recording mode, so as to, in response to an instruction to stop the recording onto the designated recording medium among the plurality of recording mediums, close the moving image files which are being recorded onto the plurality of recording mediums, stop the recording of the moving image data to the designated recording medium, open a new moving image file to the recording mediums other than the designated recording medium, add identification information of a value different from that of the identification information of the closed file to the new moving image file, and continue the recording of the new moving image file to the other recording mediums.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
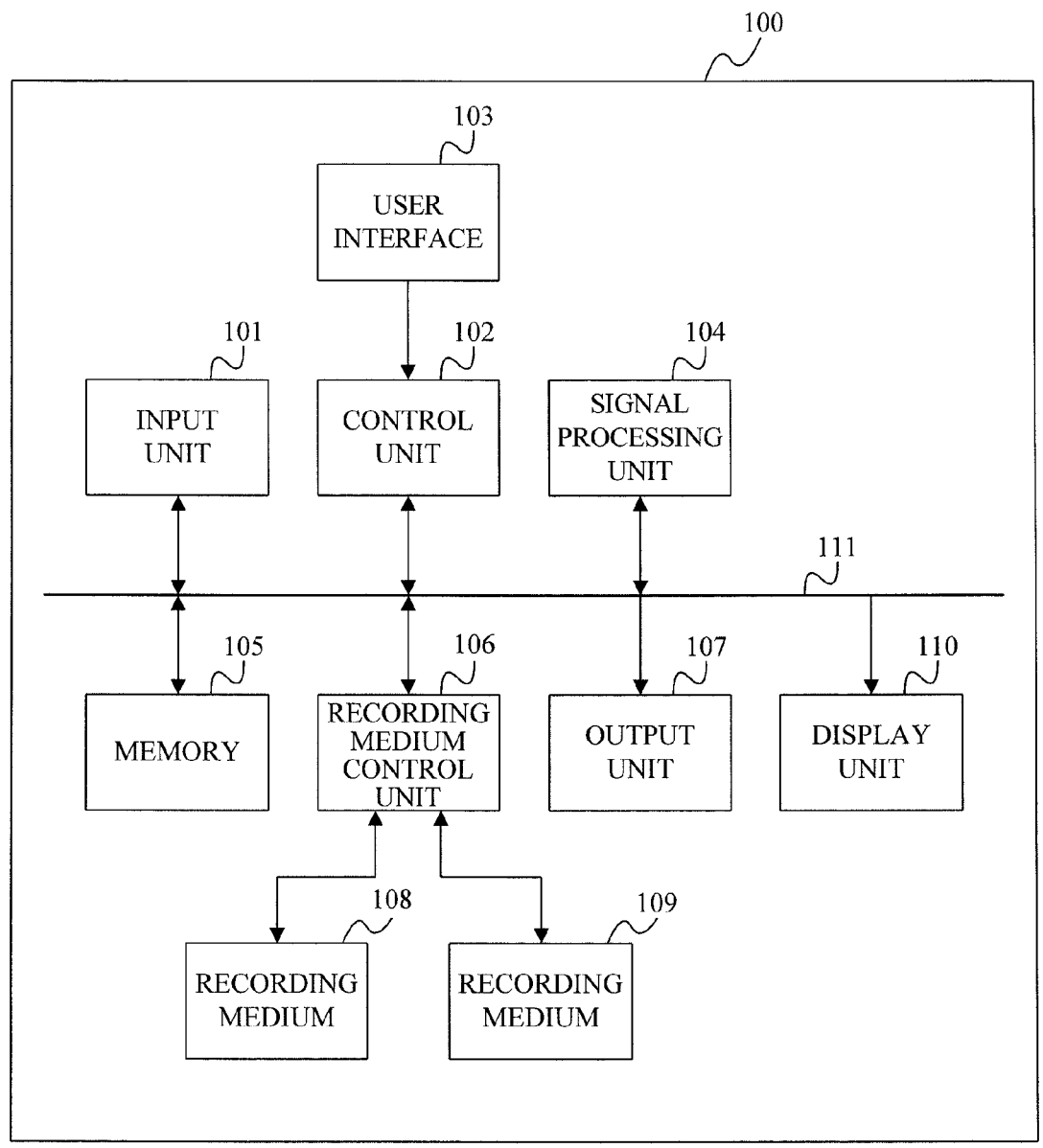
FIG. 1 is a block diagram illustrating a constructional example of a recording apparatus according to an embodiment of the invention.

FIG. 1 is a block diagram illustrating a constructional example of a recording apparatus 100 according to the embodiment.

In FIG. 1, an input unit 101 obtains moving image data and audio data and outputs. Although the input unit 101 inputs the moving image data and audio data supplied from an outside of the recording apparatus 100 in the embodiment, it may be constructed in such a manner that it includes an image pickup unit and a microphone, obtain a moving image picked up by the image pickup unit and audio data obtained through the microphone.

A control unit 102 controls the whole operation of the recording apparatus 100 in accordance with an input from a user interface (UI) 103. The control unit 102 includes a microcomputer, a memory, and the like and controls the recording apparatus 100 in accordance with a program stored in the memory (not shown). The control unit 102 has a built-in recording medium interface for communicating data and commands to/from a recording medium control unit 106. The UI 103 includes various kinds of switches which can be operated by the user. The UI 103 receives various kinds of instructions and the like from the user and notifies the control unit 102 of them. The UI 103 includes a power switch, a switch for instructing a start/stop of the recording, a switch for switching over a mode of the recording apparatus 100, and the like.

In recording process, a signal processing unit 104 encodes the moving image data and audio data input by the input unit 101 in accordance with a well-known coding format such as MPEG (Moving Picture Expert Group) or the like and compresses its information amount. The signal processing unit 104 also executes processes necessary to record the moving image data and audio data. In reproduction process, the signal processing unit 104 decodes the reproduced moving image data and audio data and expands its information amount. In recording process, the signal processing unit 104 also outputs information of a code amount (data amount) of the coded moving image data and audio data to the control unit 102.

A memory 105 stores the moving image data and audio data. Each block of the recording apparatus 100 processes the necessary moving image data and audio data by accessing the memory 105. The memory 105 stores various kinds of information such as information of a file system, management information, and the like besides the moving image data and audio data and, further, plays a role of a work memory for the control by the control unit 102 or the like.

The recording medium control unit 106 records and reproduces the moving image data and audio data or various kinds of information to/from recording mediums 108 and 109. In the recording process, the recording medium control unit 106 records the moving image data and audio data stored in the memory 105 onto the recording mediums 108 and 109. In the reproduction process, the recording medium control unit 106 reproduces the moving image data and audio data from the recording mediums 108 and 109 and stores into the memory 105. In the present embodiment, the recording mediums 108 and 109 are constructed as independent different recording mediums and are randomly-accessible recording mediums such as hard disks (HDDs), flash memory cards, or the like.

In accordance with a file system such as an FAT (File Allocation Table) or the like, the recording medium control unit 106 manages, as files, the moving image data and audio data or various kinds of information which are recorded onto the recording mediums 108 and 109. The recording medium control unit 106 has a well-known interface (I/F) such as an ATA (AT Attachment) or the like and communicates data and various kinds of commands to/from a recording medium I/F in the control unit 102. Although the recording apparatus is constructed in such a manner that the recording mediums 108 and 109 can be easily loaded and ejected into/from the recording apparatus 100 by a loading and ejecting mechanism (not shown), it may be constructed in such a manner that both of or one of the recording mediums 108 and 109 are/is built in the recording apparatus 100. The recording medium control unit 106 detects a recording space capacity of each recording medium and notifies the control unit 102 of them while the data is being recorded onto the recording mediums 108 and 109 as will be described hereinafter.

In the case of writing and reading out the moving image files onto/from the recording mediums 108 and 109, the control unit 102 controls the recording medium control unit 106 so as to reproduce the file system data (management data) from the recording mediums 108 and 109 and store into the memory 105. The file system data is data showing a file name of each data recorded on the recording mediums 108 and 109, a file size, a recording address of the data, and the like and is management information for managing the files. The control unit 102 controls the writing and reading-out of the files in accordance with the read-out file system data. The control unit 102 updates the file system data stored in the memory 105 in accordance with the writing of the files onto the recording mediums 108 and 109 and allows the recording medium control unit 106 to record the updated file system data onto the recording mediums 108 and 109.

In the present embodiment, a UUID (Universal Unique IDentifier) is added to the moving image files which are recorded onto the recording mediums 108 and 109 and the obtained moving image files are recorded. The UUID is identification information for uniquely identifying each moving image file. Each time a new moving image file is generated, the control unit 102 generates a UUID of a different value. Therefore, each moving image file can be easily identified by confirming the value of the UUID recorded on the recording mediums 108 and 109.

By operating the UI 103, the user can instruct a switching of the operation mode of the recording apparatus 100, a start/stop of the recording of the moving image data, or the like. In the present embodiment, if the two recording mediums 108 and 109 are loaded, by operating the UI 103, the user optionally selects one of the recording mediums to record the moving image data to the selected recording medium. Further, in the embodiment, if the two recording mediums 108 and 109 are loaded, the user can also instruct so as to record simultaneously the inputted moving image data to the two recording mediums 108 and 109.

An output unit 107 outputs the reproduced moving image data and audio data to a display apparatus or the like on the outside of the recording apparatus 100. A display unit 110 displays the moving image and various kinds of information onto the display apparatus such as a liquid crystal panel or the like. A data bus 111 is used to transmit and receive the data, various kinds of commands, and the like between the respective units in the recording apparatus 100.

Subsequently, the recording operation in the present embodiment will be described. The recording operation of the invention is realized by a method whereby a microcomputer of the control unit 102 loads and executes a control program stored in the memory (not shown). First, the operation in the case of recording and reproducing the moving image data onto/from only the selected recording medium will be described hereinbelow. Subsequently, the simultaneous-recording operation to a plurality of recording mediums will be described.

First, when an instruction to switch over to a recording mode of the moving image data is received from the UI 103, the recording apparatus 100 is transited to a recording standby state and waits for a recording start instruction. In the recording standby state, the moving image corresponding to the moving image data input from the input unit 101 is displayed to the display unit 110. When the recording start instruction is input from the UI 103, the signal processing unit 104 reads out the moving image data which is input by the input unit 101 and stored in the memory 105 and starts the encoding of the moving image data. The data encoded by the signal processing unit 104 is stored into the memory 105.

In the present embodiment, a data rate of the data encoded by the signal processing unit 104 is lower than a data rate at which the data can be recorded onto the recording mediums 108 and 109. Therefore, in the embodiment, the encoded data is temporarily stored into the memory 105. Each time a data amount of the encoded data stored in the memory 105 reaches a first predetermined amount, the recording medium control unit 106 reads out the encoded data from the memory 105 to record onto the recording mediums 108 and 109. At a point of time when the encoded data stored in the memory 105 decreases to a second predetermined amount smaller than the first predetermined amount, the reading-out of the encoded data from the memory 105 is temporarily stopped and the recording process to the recording mediums 108 and 109 is interrupted. The recording process is repeated in this manner. At this time, if the file is not opened, a new file to record the encoded data is generated and opened and the encoded data is recorded as a moving image file onto the recording mediums 108 and 109.

Each time one writing operation to the recording mediums is completed, the control unit 102 updates the file system data (management information) stored in the memory 105 on the basis of a recording position or the like of the encoded data written this time. The control unit 102 controls the recording medium control unit 106 to read out the updated file system data from the memory 105 and record onto the recording mediums.

The control unit 102 combines a serial number of the recording apparatus 100, recording date and time, random numbers which are prepared, and the like to generate a UUID having a numerical value of a predetermined bit length by a well-known method and add the UUID to the moving image file, and records the obtained moving image file. In response to the recording start instruction, the control unit 102 generates a UUID having a different value each time the new moving image file is generated. In the case of simultaneously recording the same data onto the two recording mediums 108 and 109 as will be described hereinafter, the UUIDs having a same value are added to the moving image files.

Figure 11:
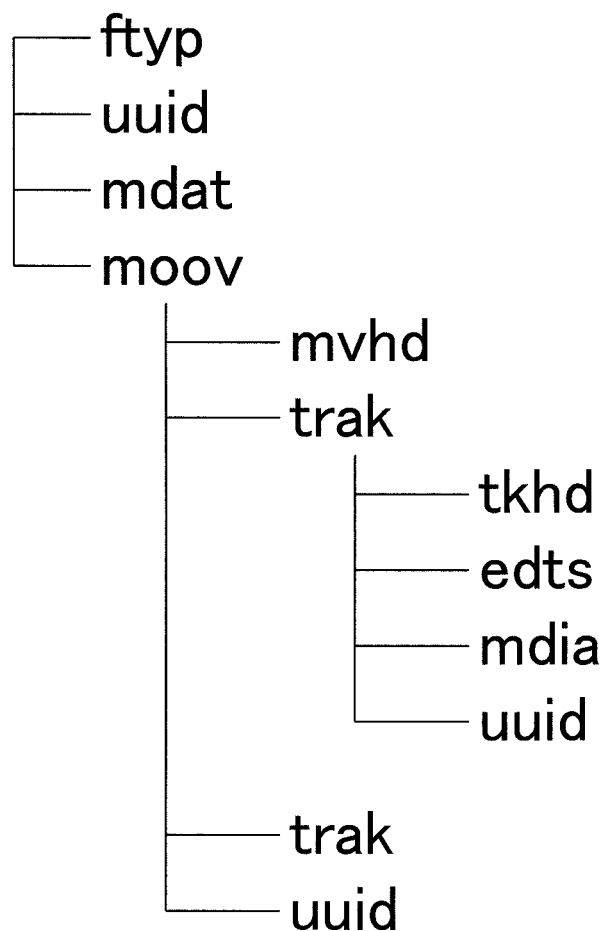
FIG. 11 is a diagram illustrating a format of an MP4 file.

In the present embodiment, the moving image file is recorded in accordance with the MP4 file format. FIG. 11 is a diagram illustrating a constructional example of an MP4 file. MP4 has a tree structure as illustrated in FIG. 11 and each layer has elements called boxes.

ftyp, uuid, mdat, and moov exist in a box of an uppermost hierarchy. Information about compatibility of moving image data and audio data is stored in the ftyp box. A UUID of the whole file is stored in the uuid box. Moving image data and audio data are stored in the mdat box. Management information for reproducing the moving image data and the audio data stored in the mdat box, and management information including file size of whole file are stored in the moov box. In the recording process, the moving image data is recorded together with audio data in the mdat box.

mvhd, a plurality of trak, and uuid exist in moov. Information such as creating date and time and the like which are not concerned with the video (moving image) and audio (sound) are stored in the mvhd box. Video track information and audio track information are stored in the trak box. A UUID of moov is stored in the uuid box. Further, tkhd, edts, mdia, and uuid exist in trak. A basic attribute of the track is stored in the tkhd box. Data on the track and reproduction information are stored in the edts box. Information regarding the track data is stored in the mdia box. A UUID of the track is stored in the uuid box.

As mentioned above, the UUID can be added to a plurality of hierarchies in one file. The embodiment will be described by using the UUID which is added to the uppermost hierarchy and is used to identify the whole file. The control unit 102 generates the UUID in the recording process of the moving image data and adds it.

In the present embodiment, in accordance with a notification from the recording medium control unit 106 or the signal processing unit 104, the control unit 102 monitors a size of file which is being recorded. The control unit 102 discriminates whether or not the size of file which is being recorded reaches a threshold value (file division threshold value) adapted to decide whether or not the file is divided. In the embodiment, the file division threshold value is decided based on an upper limit of the file size which is predetermined by the file system. That is, in the embodiment, the file division threshold value is set to an amount which is smaller than the upper limit of the file size by a predetermined amount.

In the case of using an FAT32 file system, since there is such a limitation that the maximum value of one file size is equal to 4 gigabytes (GB), the file division threshold value is set to a predetermined value (for example, 2 GB) which is equal to or less than 4 GB as an upper limit.

In the case where the file size has reached the file division threshold value during the recording, the control unit 102 instructs the recording medium control unit 106 to close the file which is opened at present, open a new file, and continue the recording of the encoded data. As mentioned above, each time the file size reaches the file division threshold value during the recording of the moving image, the recording is continued while dividing the file.

When the recording stop instruction is received from the UI 103 during the recording of the moving image, the control unit 102 stops the encoding of the moving image data which is executed by the signal processing unit 104 and instructs the recording medium control unit 106 to close the file which is being recorded. The control unit 102 instructs the recording medium control unit 106 to change reproducing order based on management information (control information) so that a plurality of moving image files recorded in a time period from the recording start instruction to the recording stop instruction are reproduced in a recording order thereof, and to record the management information onto the recording mediums. In the embodiment, in the case where the encoded data is divided into a plurality of files and recorded, a plurality of files in which a series of moving images recorded in the time period from the recording start instruction to the recording stop instruction is recorded are managed as one scene.

As mentioned above, the moving image data is recorded on the selected one of the two recording mediums 108 and 109.

Subsequently, processes of reproduction of the moving image data recorded on the recording medium by the foregoing recording operation will be described. Naturally, the reproducing process which will be described can be applied also to the simultaneously-recorded moving image data (files), which will be described hereinafter in the second and subsequent embodiments.

When an instruction to switch over to a reproduction mode is made by the UI 103, the control unit 102 instructs the recording medium control unit 106 to detect a plurality of scenes recorded on the selected one of the two recording mediums 108 and 109. The top moving image file of each scene is reproduced and a top picture of the moving image file is decoded by the signal processing unit 104 and stored into the memory 105. By the signal processing unit 104, an image signal of the decoded top picture is reduced and a representative image of each scene is generated. An index display screen constructed by representative images of a plurality of scenes is generated and displayed to the display unit 110.

By operating the UI 103, the user selects a desired one of the representative images displayed on the index display screen and instructs the reproduction. When a reproducing instruction is made, the control unit 102 controls the recording medium control unit 106 so as to reproduce one or more moving image files of the scene corresponding to the selected representative image. The recording medium control unit 106 reproduces the moving image file of the designated scene from the recording medium. The signal processing unit 104 decodes the reproduced moving image file, displays to the display unit 110, and outputs to the outside by the output unit 107.

Subsequently, the simultaneous-recording will be described. In the present embodiment, the moving image data and audio data which are input from the input unit 101 can be also simultaneously recorded onto the two recording mediums 108 and 109. In this case, since the same encoded data is recorded onto each of the recording mediums 108 and 109, timing when the file is divided is identical for each recording medium. Therefore, the files which are recorded are also identical for each recording medium.

Figure 2:
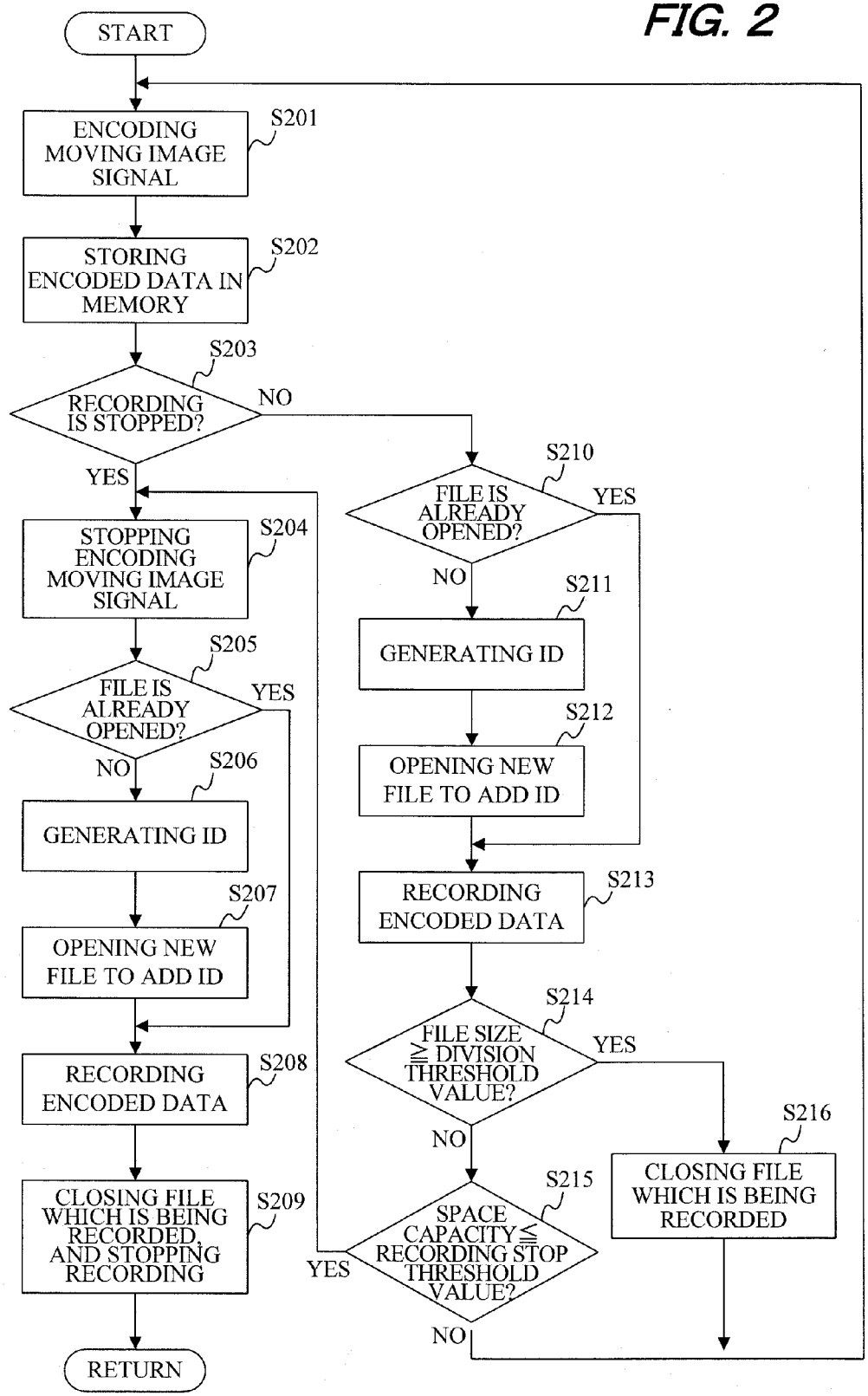
FIG. 2 is a flowchart illustrating an example of a simultaneous-recording process of the invention.

FIG. 2 is a flowchart illustrating the processes at the time of the simultaneous-recording. The processes illustrated in FIG. 2 are executed based on the control of the control unit 102.

In the recording standby state, when the user sets a simultaneous-recording mode by operating the UI 103, the control unit 102 designates both of the two recording mediums 108 and 109 as recording mediums of recording destinations. In this state, when the user inputs the recording start instruction by operating the UI 103, the control unit 102 controls the signal processing unit 104 so as to read out the moving image data which is input by the input unit 101 and stored in the memory 105 and start the encoding of the moving image data and audio data (S201). The signal processing unit 104 stores the encoded data into the memory 105 (S202). Subsequently, the control unit 102 discriminates whether or not the recording stop instruction is received from the UI 103 (S203).

As a result of the discrimination, if the recording stop instruction is not received, the control unit 102 discriminates whether or not the file is opened on the recording mediums 108 and 109 (S210).

As a result of the discrimination, if the file is not generated yet, the control unit 102 generates the UUID (S211). The control unit 102 generates a new moving image file to each recording medium and adds the UUID having the same value to each moving image file (S212). The control unit 102 instructs the recording medium control unit 106 so as to write the encoded data into the file which is currently open (S213).

Subsequently, the control unit 102 compares a size of moving image file which is being recorded with the file division threshold value (S214). As a result of the comparison, if the file size is equal to or larger than the file division threshold value, the control unit 102 closes the file which is currently open (S216) and the processing routine is returned to S201.

If the file size does not reach the file division threshold value, the following discrimination is made in S215. That is, on the basis of the information of the recording space capacity from the recording medium control unit 106, the control unit 102 discriminates whether or not the recording space capacity of one of the recording mediums 108 and 109 is equal to or less than a threshold value adapted to discriminate the recording stop. If the recording space capacity of each of the recording mediums is larger than the threshold value, the processing routine is returned to S201 in order to continue the recording process as it is.

In the embodiment, each time the encoded data of a predetermined amount is stored in the memory 105, the encoded data is read out of the memory 105 and recorded onto the recording mediums 108 and 109. For this purpose, the threshold value adapted to stop the recording is set as a predetermined value larger than the amount of data which is stored in the memory 105. Thus, even if the recording space capacity of each of the recording mediums 108 and 109 runs out (is smaller than the predetermined value) in a state where the encoded data stored in the memory 105 is not recorded onto the recording mediums 108 and 109, a loss of the data in the memory can be avoided. In other words, all of the encoded data stored in the memory 105 at this point of time can be recorded onto the recording mediums 108 and 109.

If the recording space capacity of one of the recording mediums is equal to or less than the threshold value in S215 or if the recording stop instruction is received in S203, the control unit 102 stops the encoding which is executed by the signal processing unit 104 (S204). Subsequently, the control unit 102 discriminates whether or not the file to record the moving image data is opened (S205). As a result of the discrimination, if the file is not opened, the control unit 102 generates the UUID (S206). The control unit 102 generates a new moving image file to each recording medium and adds to each moving image file (S207). A case where it is determined in S205 that the file is not opened is a case where after the recording is started, the recording stop instruction is received before an amount of encoded data stored in the memory 105 reaches the predetermined value. Another case where it is determined in S205 that the file is not opened is a case where after the file which is being recorded is closed in S216, the recording stop instruction is received before the amount of encoded data stored in the memory 105 reaches the predetermined value.

As a result of the discrimination of S205, if the file is already opened, the control unit 102 instructs the recording medium control unit 106 to write the encoded data into the file which is currently open (S208). In this instance, the encoded data is stored in the memory 105 in a time period until the recording stop instruction is received after the writing of the encoded data from the memory 105 is interrupted at the previous time. Therefore, the encoded data is read out from the memory 105 and written onto the recording medium 108 by the recording medium control unit 106. The file which is being recorded is closed and the recording is stopped (S209). The control unit 102 instructs the recording medium control unit 106 to change the reproduction order based on the management information (control information) so that a plurality of moving image files recorded in the time period from the recording start instruction to the recording stop instruction are reproduced in recording order thereof, and to record the management information.

Figure 3:
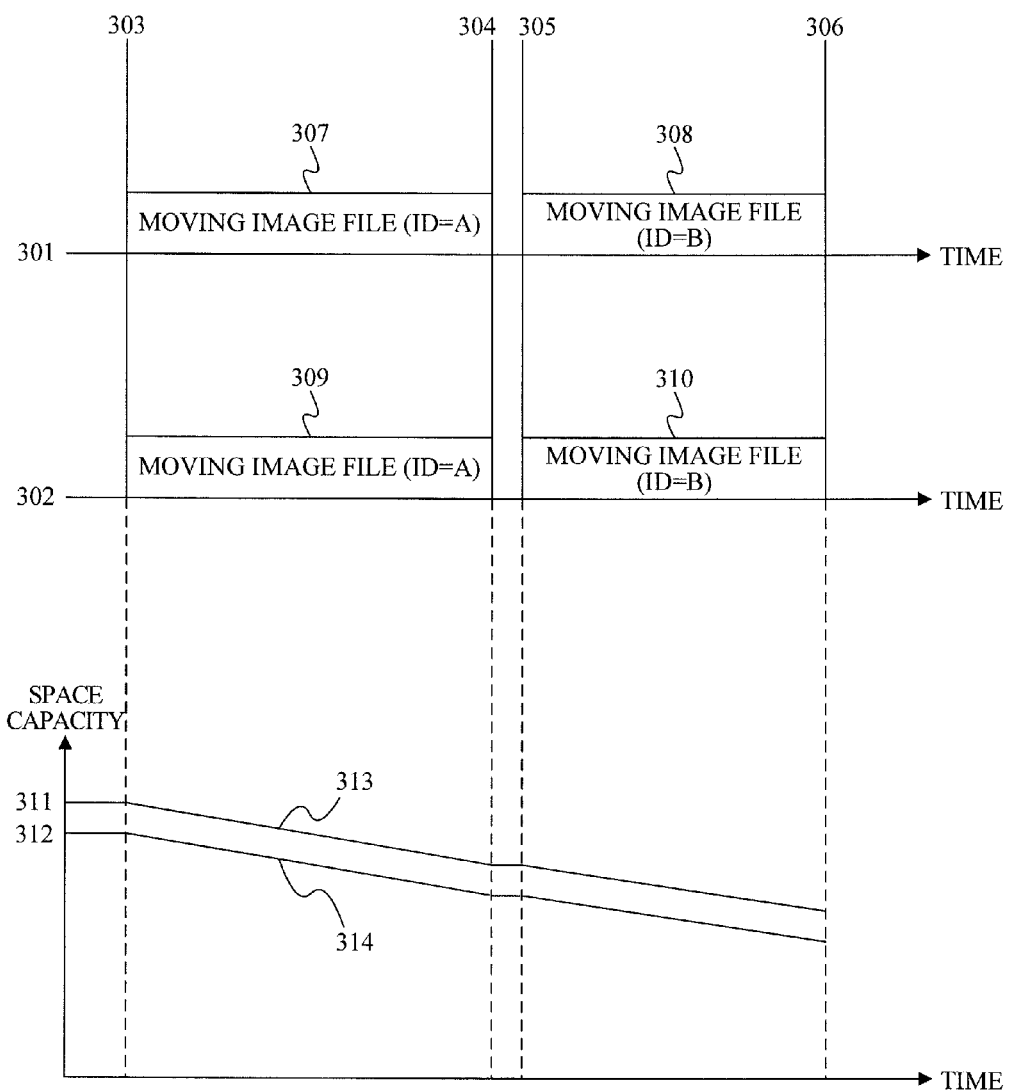
FIG. 3 is a diagram illustrating a relation between a status of each file which is recorded onto a recording medium and a recording space capacity in the simultaneous-recording process in FIG. 2.

FIG. 3 is a diagram illustrating a relation between the moving image files which are recorded in the simultaneous-recording mode and the recording space capacity of each recording medium. A moving image file 301 is a file which is recorded onto the recording medium 108. A moving image file 302 is a file which is recorded onto the recording medium 109. When the recording start instruction is made at time 303, moving image files 307 and 309 are generated and recorded onto the recording mediums 108 and 109, respectively. UUIDs having a same value A are added to the moving image files 307 and 309. As mentioned above, the recording of the moving images is continued and when a size of each of the moving image files 307 and 309 reaches the file division threshold value at time 304, the moving image files 307 and 309 are closed. New moving image files 308 and 310 are generated and recorded onto the recording mediums 108 and 109 at time 305, respectively. UUIDs having a same value B are added to the moving image files 308 and 310. When the recording stop instruction is made at time 306, the moving image files 308 and 310 are closed and the recording of the data onto the recording mediums 108 and 109 is stopped.

Recording space capacities 313 and 314 of the recording mediums 108 and 109 are illustrated in FIG. 3. Before the simultaneous-recording is started, values of recording space capacities 311 and 312 of the recording mediums 108 and 109 are illustrated in FIG. 3. When the recording of the encoded data is started, each recording space capacity decreases gradually.

As mentioned above, the moving image files 307 and 309 which are simultaneously recorded are the files having the same contents and the moving image files 308 and 310 are also the files having the same contents. The same UUID is added to the two moving image files having the same contents and the obtained files are recorded.

Figure 4:
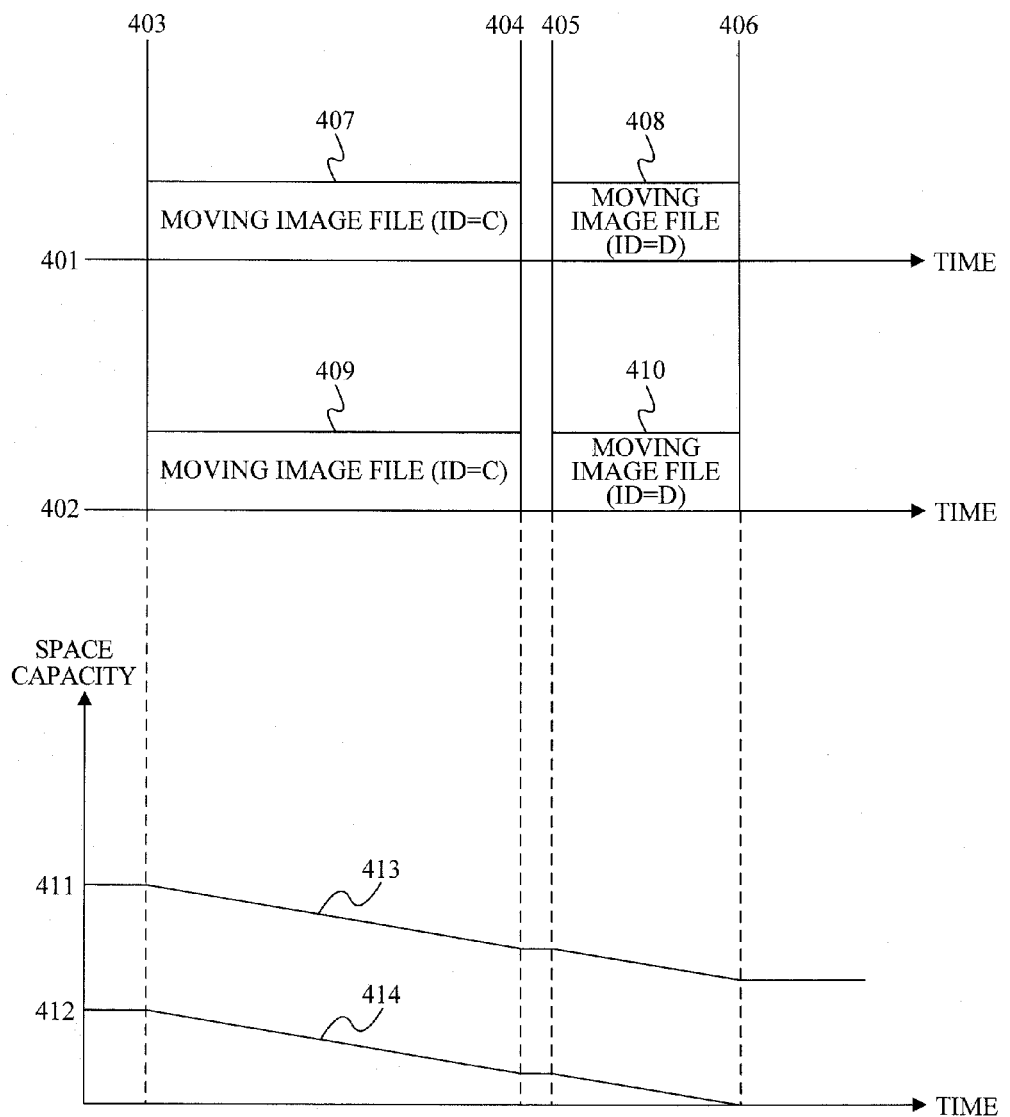
FIG. 4 is a diagram illustrating a relation between a status of each file which is recorded onto the recording medium and each recording space capacity in the simultaneous-recording process in FIG. 2.

FIG. 4 is a diagram illustrating a relation between the moving image files which are recorded in the simultaneous-recording mode and the recording space capacity of each recording medium in a manner similar to FIG. 3. FIG. 4 illustrates a state where the recording space capacity of the recording medium 109 runs out.

A moving image file 401 is a file which is recorded onto the recording medium 108. A moving image file 402 is a file which is recorded onto the recording medium 109. When the recording start instruction is made at time 403, moving image files 407 and 409 are generated and recorded onto the recording mediums 108 and 109, respectively. UUIDs having a same value C are added to the moving image files 407 and 409. As mentioned above, the recording of the moving images is continued and when a size of each of the moving image files 407 and 409 reaches the file division threshold value at time 404, the moving image files 407 and 409 are closed. New moving image files 408 and 410 are generated and recorded onto the recording mediums 108 and 109 at time 405, respectively. UUIDs having a same value D are added to the moving image files 408 and 410.

Recording space capacities 411 and 412 of the recording mediums 108 and 109 are illustrated. Before the simultaneous-recording is started, the recording space capacity of the recording medium 108 is equal to a value shown at 411 and the recording space capacity of the recording medium 109 is equal to a value shown at 412. When the recording of the moving images is started at time 403, each recording space capacity decreases gradually. The recording space capacity of the recording medium 109 runs out at a point of time 406. Thus, the moving image files 408 and 410 are closed and, after that, the recording of the encoded data onto the recording mediums 108 and 109 is stopped.

As mentioned above, in the present embodiment, the recording space capacity of one of the recording mediums runs out during the simultaneous-recording, the moving image file which is being recorded onto each recording medium is closed. Therefore, in FIG. 4, the moving image files 407 and 409 include the same moving image and the moving image files 408 and 410 include the same moving image. The UUIDs of the same value are added to the moving image files 407 and 409 and the UUIDs of the same value is added to the moving image files 408 and 410.

Thus, even if the recording space capacity of one of the recording mediums runs out during the simultaneous-recording, it is guaranteed that the same moving image data is stored in the moving image files to which the same UUID is added. Therefore, it is unnecessary for the user to confirm whether or not the contents of the moving image files to which the same identification information is added are identical.

Although the UUID is used as identification information of the moving image file in the present embodiment, other identification information can be also used. For example, as long as it can be discriminated that the moving image files are the moving image files which are simultaneously recorded and have the same contents, any information may be used.

Second Embodiment

Subsequently, the second embodiment will be described. Also in this embodiment, a construction of the recording apparatus 100 and its fundamental recording and reproducing processes are substantially the same as those in the first embodiment. For example, the user inputs instructions about the operation mode, recording stop, and the like by operating the UI 103.

In the embodiment, when the recording space capacity of one of the recording mediums runs out during the simultaneous-recording of the moving images onto the two recording mediums 108 and 109, the recording of the moving image onto the recording medium which still has a recording space capacity is continued.

Figure 5:
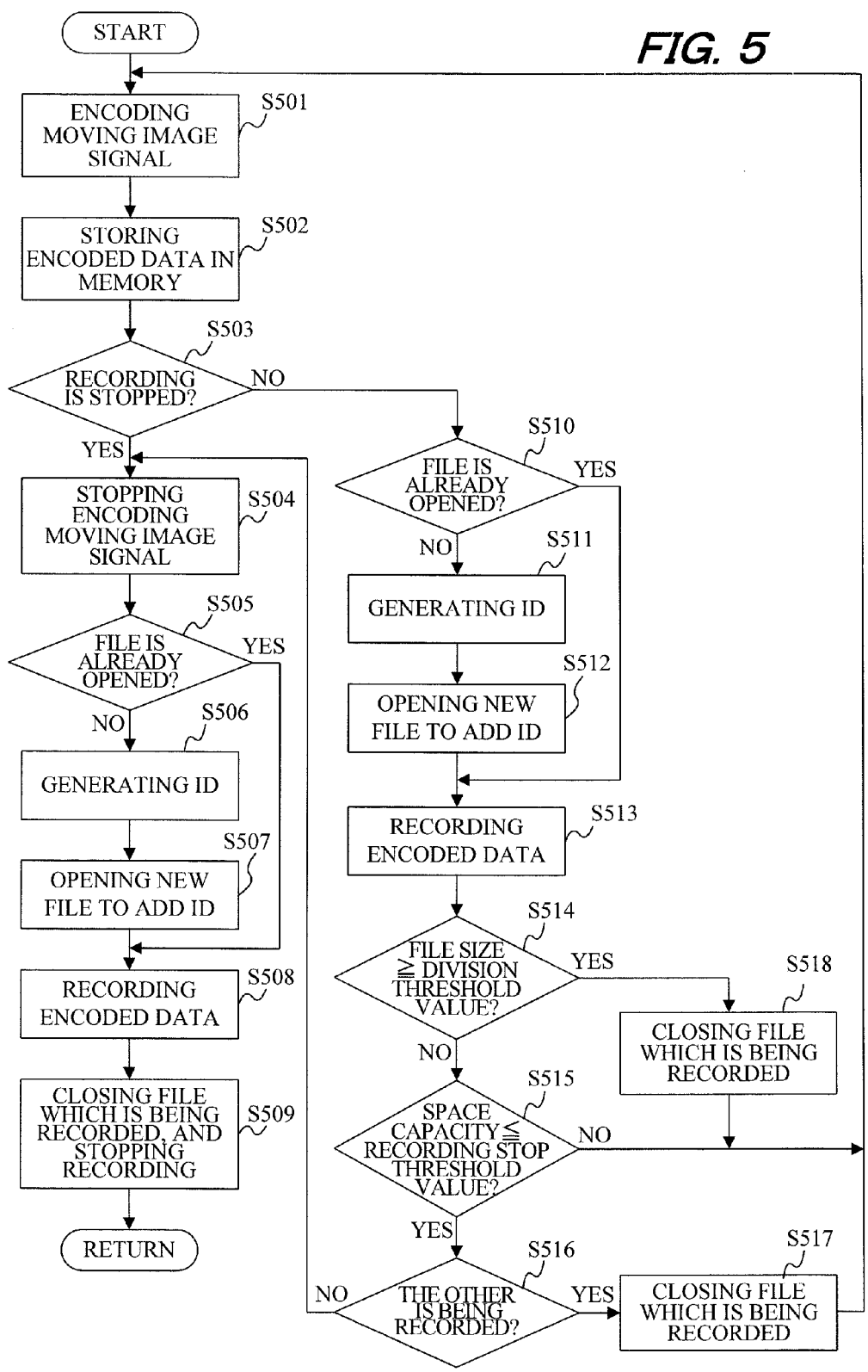
FIG. 5 is a flowchart illustrating another example of the simultaneous-recording process of the invention.

FIG. 5 is a flowchart illustrating a simultaneous-recording process in the embodiment. Each process illustrated in FIG. 5 is executed based on the control of the control unit 102.

In the recording standby state, when the user sets the simultaneous-recording mode by operating the UI 103, the control unit 102 designates both of the two recording mediums 108 and 109 as recording mediums of the recording destinations. In this state, when the user inputs the recording start instruction by operating the UI 103, the control unit 102 controls the signal processing unit 104 so as to read out the moving image data which is input by the input unit 101 and stored in the memory 105 and start the encoding of the moving image data and audio data (S501). The signal processing unit 104 stores the encoded data into the memory 105 (S502). Subsequently, the control unit 102 discriminates whether or not the recording stop instruction is received from the UI 103 (S503).

As a result of the discrimination, if the recording stop instruction is not received, the control unit 102 discriminates whether or not the file is opened on the recording mediums 108 and 109 (S510). As will be described hereinafter, if the recording of the encoded data to one of the two recording mediums 108 and 109 is stopped, the control unit 102 discriminates whether or not the file is opened on the recording medium in which the recording is continued.

As a result of the discrimination, if the file is not generated yet, the control unit 102 generates the UUID (S511). The control unit 102 generates a new moving image file to each recording medium and adds the UUID having the same value to each moving image file (S512). The control unit 102 instructs the recording medium control unit 106 to write the encoded data into the file which is currently open (S513).

Subsequently, the control unit 102 compares the size of moving image file which is being recorded with the file division threshold value (S514). As a result of the comparison, if the file size is equal to or larger than the file division threshold value, the control unit 102 closes the file which is currently open (S518) and the processing routine is returned to S501.

If the file size does not reach the file division threshold value, on the basis of the information of the recording space capacity from the recording medium control unit 106, the control unit 102 discriminates whether or not the recording space capacity of one of the recording mediums 108 and 109 is equal to or less than the recording stop threshold value (S515). If the recording space capacity of each of the recording mediums is larger than the threshold value, the processing routine is returned to S501 in order to continue the recording process as it is.

If the recording space capacity of one of the recording mediums is equal to or less than the threshold value, the control unit 102 detects the recording medium whose recording space capacity is equal to or less than the threshold value. The control unit 102 discriminates whether or not the encoded data is being recorded on the recording medium other than the recording medium whose recording space capacity is equal to or less than the threshold value (S516). For example, if it is detected that the recording space capacity of the recording medium 108 is equal to or less than the threshold value, whether or not the data is being recorded on the recording medium 109 is discriminated. If the encoded data is being recorded on the other recording medium, the control unit 102 instructs the recording medium control unit 106 to close the moving image files which are being recorded onto both of the recording mediums (S517). After that, the recording of the moving image onto the recording medium whose recording space capacity runs out is stopped and the processing routine is returned to S501. After that, the recording of the encoded data onto the recording medium other than the recording medium whose recording space capacity is equal to or less than the threshold value is continued.

If the recording stop instruction is received in S503 or if the recording of the encoded data onto the recording medium other than the recording medium whose recording space capacity is equal to or less than the threshold value is stopped in S516, the control unit 102 stops the encoding which is executed by the signal processing unit 104 (S504). Subsequently, the control unit 102 discriminates whether or not the file to record the moving image data is opened (S505). If the file is not opened, the control unit 102 generates the UUID (S506). The control unit 102 generates a new moving image file and adds to the moving image file (S507). A case where it is determined that the file is not opened in S505 is a case where after the recording is started, the recording stop instruction is received before an amount of encoded data stored in the memory 105 reaches the predetermined value. Another case where it is determined that the file is not opened in S505 is a case where after the file which is being recorded is closed in S517 and S518, the recording stop instruction is received before an amount of encoded data stored in the memory 105 reaches the predetermined value.

As a result of the discrimination of S505, if the file is already opened, the control unit 102 instructs the recording medium control unit 106 to write the encoded data into the file which is currently open (S508). In this instance, the encoded data is stored in the memory 105 in the time period until the recording stop instruction is received after the writing of the encoded data from the memory 105 is interrupted at the previous time. Therefore, the encoded data is read out of the memory 105 and written onto the recording medium 108 by the recording medium control unit 106. The file which is being recorded is closed and the recording is stopped (S509). The control unit 102 instructs the recording medium control unit 106 to change the reproducing order based on the management information (control information) so that a plurality of moving image files recorded in the time period from the recording start instruction to the recording stop instruction are reproduced in recording order thereof, and to record the management information.

Figure 6:
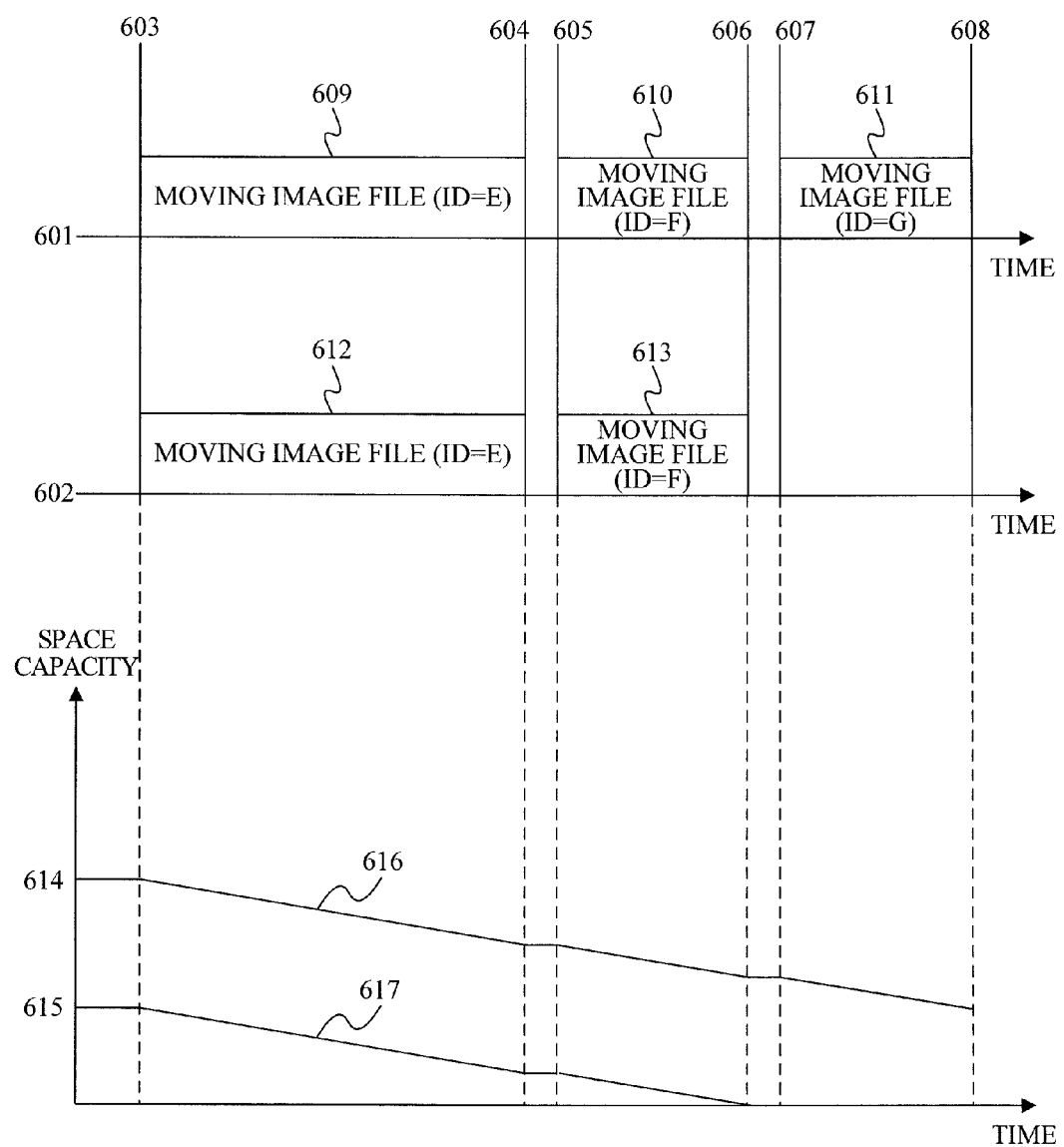
FIG. 6 is a diagram illustrating a relation between a status of each file which is recorded onto the recording medium and each recording space capacity in the simultaneous-recording process in FIG. 5.

FIG. 6 is a diagram illustrating a relation between the moving image files which are recorded in the simultaneous-recording mode in the second embodiment and the recording space capacity of each recording medium. A moving image file 601 is a file which is recorded onto the recording medium 108. A moving image file 602 is a file which is recorded onto the recording medium 109. When the recording start instruction is made at time 603, moving image files 609 and 612 are generated and recorded onto the recording mediums 108 and 109, respectively. UUIDs having a same value E are added to the moving image files 609 and 612. As mentioned above, the recording of the moving images is continued and when a size of each of the moving image files 609 and 612 reaches the file division threshold value at time 604, the moving image files 609 and 612 are closed. New moving image files 610 and 613 are generated and recorded onto the recording mediums 108 and 109 at time 605, respectively. UUIDs having a same value F are added to the moving image files 610 and 613.

Recording space capacities 616 and 617 of the recording mediums 108 and 109 are illustrated. Before the simultaneous-recording is started, the recording space capacity of the recording medium 108 is equal to a value shown at 614 and the recording space capacity of the recording medium 109 is equal to a value shown at 615. When the recording of the moving images is started at time 603, each recording space capacity decreases gradually. The recording space capacity of the recording medium 109 runs out at a point of time 606. Thus, the moving image files 610 and 613 are closed. Since the recording space capacity of the recording medium 109 runs out, the recording of the encoded data onto the recording medium 109 is stopped after that.

Since the recording medium 108 still has the recording space capacity, a new moving image file 611 is generated and recorded onto the recording medium 108 at time 607. A UUID having a value G is added to the moving image file 611. When the recording stop instruction is made at time 608, the moving image file 611 is closed and the recording of the encoded data onto the recording medium 108 is stopped.

As mentioned above, in the embodiment, when the recording space capacity of one of the recording mediums runs out during the simultaneous-recording or when the recording stop instruction is made to one of the recording mediums, the moving image file which is being recorded onto each recording medium is closed. Therefore, the moving image files 609 and 612 which are simultaneously recorded are the files having the same contents. The same UUID is added to the two moving image files having the same contents and the obtained files are recorded. The UUIDs of the value different from that of the moving image files 609 and 610 is added to the moving image files which are recorded onto the recording medium 108.

Thus, it is guaranteed that the same moving image data is stored in the moving image files to which the same UUID is added. Therefore, it is unnecessary for the user to confirm whether or not the contents of the moving image files to which the same identification information is added are identical.

Third Embodiment

Subsequently, the third embodiment will be described. Also in this embodiment, a construction of the recording apparatus 100 and its fundamental recording and reproducing processes are substantially the same as those in the first embodiment. In the embodiment, during the simultaneous-recording of the moving images onto the two recording mediums 108 and 109, the user may optionally instruct the recording stop onto one of the recording mediums.

Figure 7:
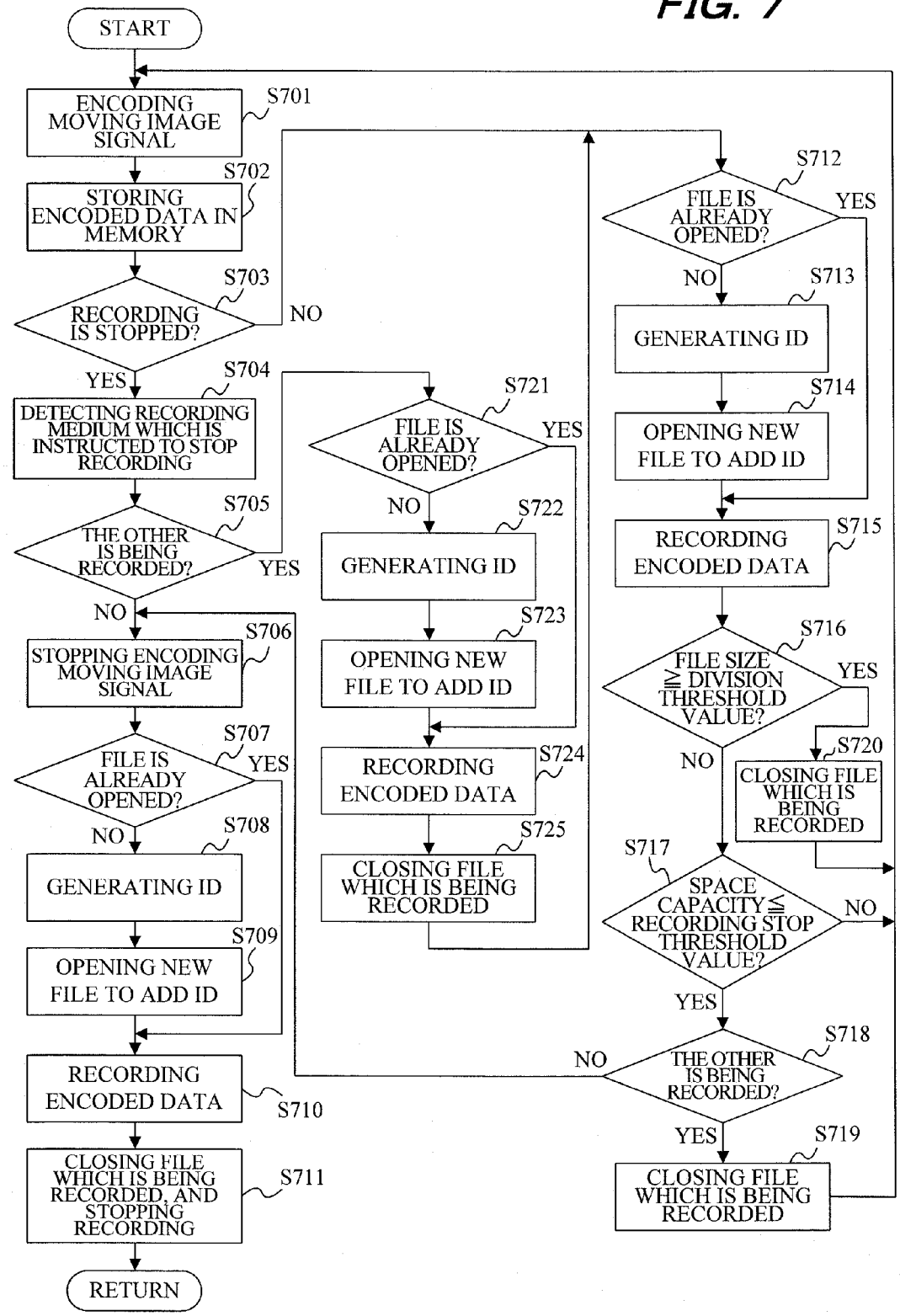
FIG. 7 is a flowchart illustrating still another example of the simultaneous-recording process of the invention.

FIG. 7 is a flowchart illustrating processes at the time of the simultaneous-recording in the embodiment. Each process illustrated in FIG. 7 is executed based on the control of the control unit 102.

In the recording standby state, the user sets the simultaneous-recording mode by operating the UI 103, so that the simultaneous-recording function is validated. In this state, when the user inputs the recording start instruction by operating the UI 103, the control unit 102 controls the signal processing unit 104 so as to read out the moving image data which is input by the input unit 101 and stored in the memory 105 and start the encoding of the moving image data and audio data (S701). The signal processing unit 104 stores the encoded data into the memory 105 (S702). Subsequently, the control unit 102 discriminates whether or not the recording stop instruction is received from the UI 103 (S703).

As a result of the discrimination, if the recording stop instruction is not received, the control unit 102 discriminates whether or not the file is opened on the recording mediums 108 and 109 (S712). If the recording onto one of the two recording mediums 108 and 109 is stopped, whether or not the file is opened on the recording medium in which the recording stop instruction is not received (the recording is continued) is discriminated. The discrimination in this case is made after S725, which will be described hereinafter.

As a result of the discrimination, if the file is not generated yet, the control unit 102 generates the UUID (S713). The control unit 102 generates a new moving image file and adds the UUID having the same value to each moving image file (S714). When the moving image files are being recorded onto both of the recording mediums, the control unit 102 generates a new moving image file to each recording medium and adds the UUID having the same value to each moving image file. If the recording of the moving image onto one of the recording mediums is stopped, a new moving image file is generated on the other moving recording medium and the UUID is added. The control unit 102 instructs the recording medium control unit 106 so as to write the encoded data into the file which is currently open (S715).

Subsequently, the control unit 102 compares the size of moving image file which is being recorded with the file division threshold value (S716). If the file size is equal to or larger than the file division threshold value, the control unit 102 instructs the recording medium control unit 106 so as to close all of the files which are currently open (S720) and the processing routine is returned to S701.

If the file size does not reach the file division threshold value, on the basis of the information of the recording space capacity from the recording medium control unit 106, the control unit 102 discriminates whether or not the recording space capacity of one of the recording mediums 108 and 109 is equal to or less than the recording stop threshold value (S717). If the recording space capacities of all of the recording mediums are larger than the threshold value, the processing routine is returned to S701 in order to continue the recording process as it is.

If the recording space capacities of one of the recording mediums is equal to or less than the threshold value, the control unit 102 detects the recording medium whose recording space capacity is equal to or less than the threshold value. The control unit 102 discriminates whether or not the encoded data is being recorded on the recording medium other than the recording medium whose recording space capacity is equal to or less than the threshold value (S718). If the encoded data is being recorded on the other recording medium, the moving image files which are being recorded onto both of the recording mediums are closed (S719). After that the recording of the moving image onto the recording medium whose recording space capacity runs out is stopped and the processing routine is returned to S701. Also after that, the recording of the encoded data onto the recording medium other than the recording medium whose recording space capacity is equal to or less than the threshold value is continued.

If the recording stop instruction is made in S703, the control unit 102 detects the recording mediums in which the recording stop is instructed (S704). When the user instructs the recording stop by operating the UI 103 during the simultaneous-recording of the moving images to the two recording mediums 108 and 109, the control unit 102 displays an inquiry dialog screen for selecting the recording medium which is instructed to stop the recording onto the display unit 110. When the inquiry dialog screen is displayed onto the display unit 110, the user operates the UI 103 and selects the recording medium in which the recording is to be stopped.

In response to the recording stop instruction which is made as mentioned above, the control unit 102 discriminates whether or not the encoded data is being recorded onto the recording medium other than the recording medium which is instructed to stop the recording (S705). If the encoded data is being recorded onto the other recording medium, the processing routine advances to S721.

If the recording of the encoded data onto the recording medium other than the recording medium which is instructed to stop the recording is stopped or if the recording of the encoded data onto the recording medium other than the recording medium whose recording space capacity is equal to or less than the threshold value is already stopped in S718, the processing routine advances to S706. The encoding of the moving image data by the signal processing unit 104 is stopped (S706). Subsequently, the control unit 102 discriminates whether or not the file for recording the moving image data is opened (S707). If the file is not opened, the control unit 102 generates the UUID (S708). A new file to record the encoded data is generated and the UUID is added to the moving image file (S709). If the recording of the moving image onto one of the recording mediums is stopped, the file is generated only to the other recording medium.

A case where it is determined in S707 that the file is not opened is a case where after the recording is started, the recording stop instruction is received for both of the recording mediums before the amount of encoded data stored in the memory 105 reaches the predetermined amount. Another case where it is determined in S707 that the file is not opened is a case where after the file which is being recorded is closed in S719 and S720, the recording stop instruction is received before the amount of encoded data stored in the memory 105 reaches the predetermined amount.

As a result of the discrimination of S707, if the file is already opened, by the recording medium control unit 106, the encoded data is written into the file which is currently open (S710). In this instance, the encoded data is stored in the memory 105 for the time period until the recording stop instruction is received after the writing of the encoded data from the memory 105 is interrupted at the previous time. Therefore, the encoded data is read out of the memory 105 and written onto the recording medium 108 by the recording medium control unit 106. The file which is being recorded is closed and the recording is stopped (S711). The reproducing order based on the management information (control information) is changed so that a plurality of moving image files recorded for the time period from the recording start instruction to the recording stop instruction are reproduced in recording order thereof and they are recorded onto the respective recording mediums.

If the encoded data is being recorded onto the recording medium other than the recording medium which is instructed to stop the recording in S705, the control unit 102 discriminates whether or not the file for recording the moving image data onto both of the recording mediums 108 and 109 is opened (S721). If the file is not opened, the control unit 102 generates the UUID (S722). A new file to record the encoded data onto both of the recording mediums 108 and 109 is generated and the UUID is added to the moving image file (S723).

A case where it is determined in S721 that the file is not opened is a case where after the recording is started, the recording stop instruction is received for both of the recording mediums before the amount of encoded data stored in the memory 105 reaches the predetermined amount. Another case where it is determined in S721 that the file is not opened is a case where after the file which is being recorded is closed in S719 and S720, the recording stop instruction is received before the amount of encoded data stored in the memory 105 reaches the predetermined amount.

As a result of the discrimination of S721, if the file is already opened, by the recording medium control unit 106, the encoded data is written into the file which is currently open (S724). In this instance, the encoded data is stored in the memory 105 in the time period until the recording stop instruction is received after the writing of the encoded data from the memory 105 is interrupted at the previous time. Therefore, the encoded data is read out of the memory 105 and written onto the recording mediums 108 and 109 by the recording medium control unit 106. All of the files which are being recorded are closed (S725) and the processing routine advances to S712. After that, the recording of the moving image is stopped for the recording medium which is instructed to stop the recording. By the processes of S721 to S725, while the moving images are simultaneously being recorded onto the two recording mediums 108 and 109, if the recording stop instruction is made to one of the recording mediums, the moving image files which are being recorded onto both of the recording mediums are closed in response to the recording stop instruction. After the moving image file which is being recorded onto the recording medium which is not instructed to stop the recording is closed in S725, the processing routine advances to S712. A new moving image file is opened and the recording onto the recording medium which is not instructed to stop the recording is continued.

Figure 8:
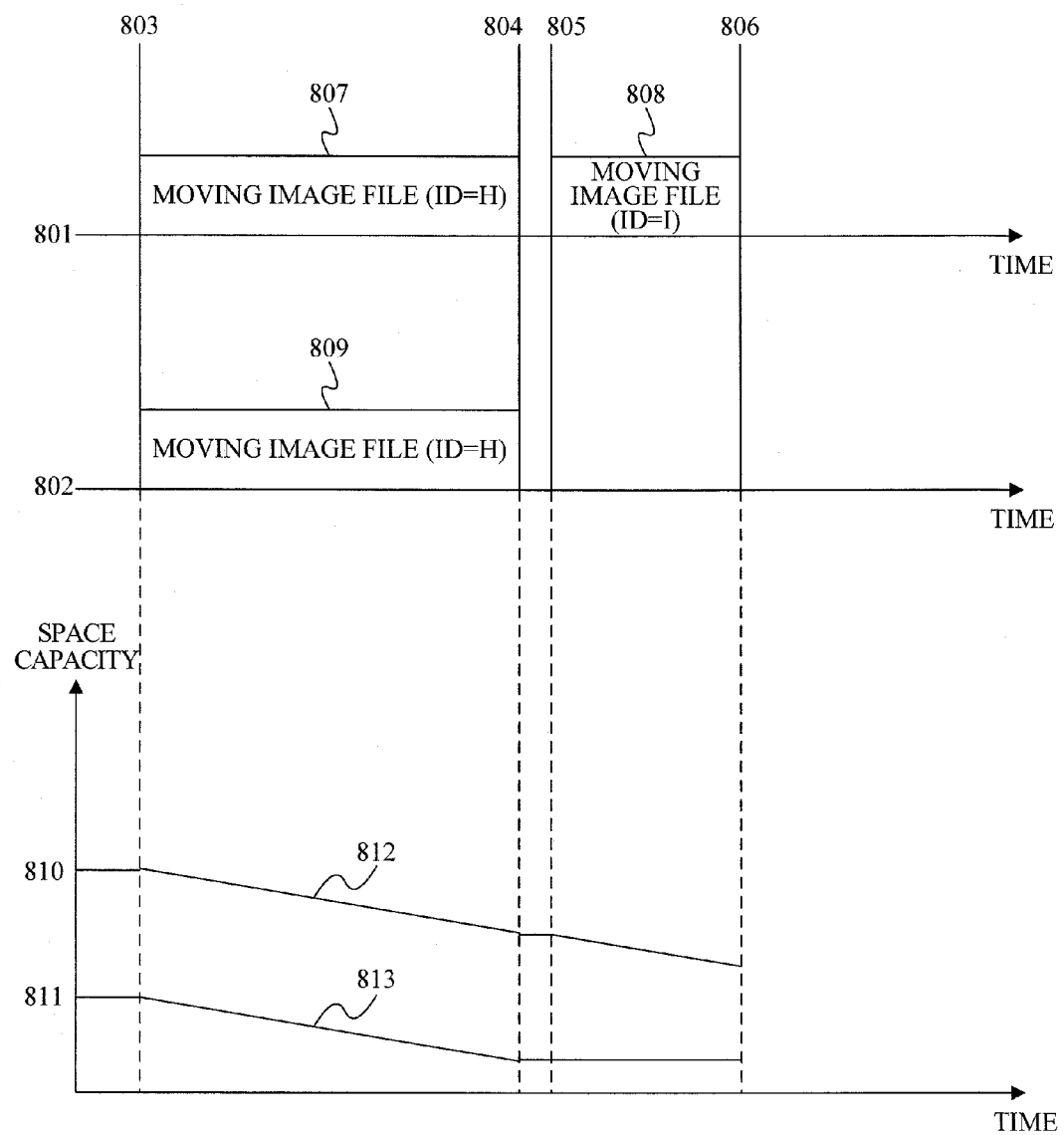
FIG. 8 is a diagram illustrating a relation between a status of each file recorded onto the recording medium and each recording space capacity in the simultaneous-recording process in FIG. 7.

FIG. 8 is a diagram illustrating a relation between the moving image files which are recorded in the simultaneous-recording mode in the third embodiment and the recording space capacity of each recording medium. A moving image file 801 is a file which is recorded onto the recording medium 108. A moving image file 802 is a file which is recorded onto the recording medium 109. When the recording start instruction is made at time 803, moving image files 807 and 809 are generated and recorded to the recording mediums 108 and 109, respectively. UUIDs having a same value H are added to the moving image files 807 and 809. As mentioned above, the recording of the moving images is continued and when the recording stop instruction to the recording medium 109 is made at time 804, the moving image files 807 and 809 are closed. After that, the recording of the moving image onto the recording medium 109 is stopped. A new moving image file 808 is generated at time 805 and the recording of the moving image file onto the recording medium 108 is continued. A UUID having a value I is added to the moving image file 808. When the recording stop instruction is made at time 806, the moving image file 808 is closed and the recording of the data onto the recording medium 108 is stopped.

Recording space capacities 812 and 813 of the recording mediums 108 and 109 are illustrated in FIG. 8. Before the simultaneous-recording is started, the recording space capacities of the recording mediums 108 and 109 are equal to values shown at 810 and 811. When the recording of the encoded data is started, each recording space capacity decreases gradually. When the recording stop instruction to the recording medium 109 is made at time 804, since the recording onto the recording medium 109 is stopped after that, the recording space capacity does not change.

As mentioned above, in the embodiment, when the recording space capacity of one of the recording mediums runs out during the simultaneous-recording or when the recording stop instruction is made to one of the recording mediums, the moving image file which is being recorded onto each recording medium is closed. Therefore, the moving image files 807 and 809 which are simultaneously recorded are the files having the same contents. The same UUID is added to the two moving image files having the same contents and the obtained files are recorded.

Thus, it is guaranteed that the same moving image data is stored in the moving image files to which the same UUID is added. Therefore, it is unnecessary for the user to confirm whether or not the contents of the moving image files to which the same identification information is added are identical.

In the embodiment, when the user instructs the recording stop during the simultaneous-recording, any one of the recording mediums is selected and the recording stop instruction is made. However, the recording stop may be simultaneously instructed to the two recording mediums and the recording of the moving image may be stopped.

When the user instructs the recording stop, if the recording of the moving image to one of the recording mediums is already stopped, the inquiry dialog screen for selecting the recording medium which is instructed to stop the recording is not displayed onto the display unit 110.

Instead of displaying the inquiry dialog screen for selecting the recording medium which is instructed to stop the recording onto the display unit 110, it is also possible to construct in such a manner that when the recording stop instruction is made during the simultaneous-recording, the recording onto the predetermined recording medium is stopped. An operation key to independently instruct the recording stop to each recording medium may be provided on the UI 103.

Fourth Embodiment

Subsequently, the fourth embodiment will be described. Also in this embodiment, a construction of the recording apparatus 100 and its fundamental recording and reproducing processes are substantially the same as those in the first embodiment. In the embodiment, while the moving image is being recorded onto one of the two recording mediums 108 and 109, the recording start instruction to the other recording medium is made and the simultaneous-recording is performed. During the simultaneous-recording, the user optionally instructs the recording stop onto one of the recording mediums and stops the recording.

Figure 9:
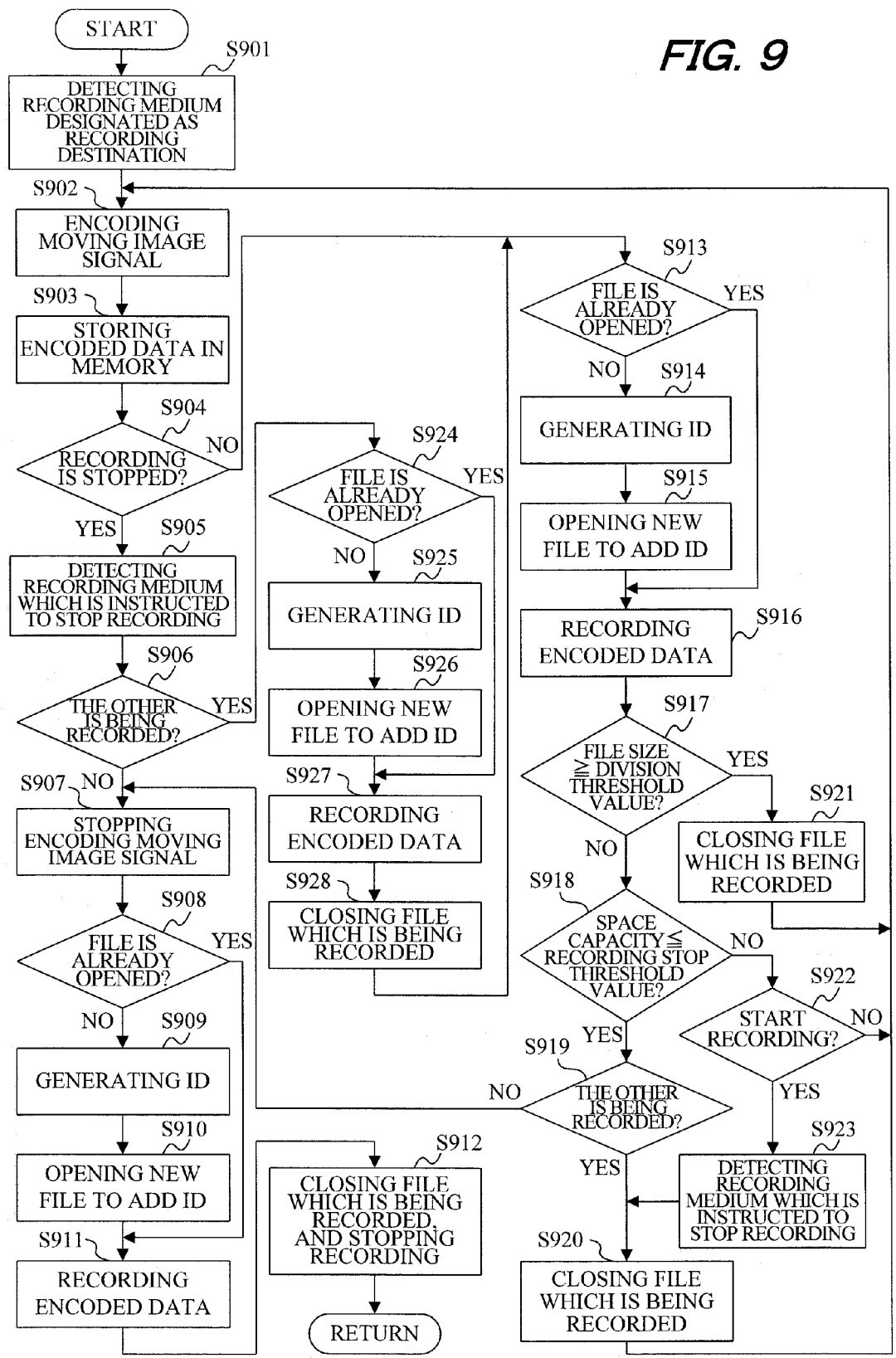
FIG. 9 is a flowchart illustrating further other example of the simultaneous-recording process of the invention.

FIG. 9 is a flowchart illustrating the processes upon simultaneous-recording in the embodiment. Each process illustrated in FIG. 9 is executed based on the control of the control unit 102.

In the recording standby state, when the user selects one of the recording mediums 108 and 109 as a recording destination and instructs the recording start by operating the UI 103, the control unit 102 detects the recording medium selected as a recording destination (S901). The control unit 102 controls the signal processing unit 104 so as to read out the moving image data and audio data which are input by the input unit 101 and stored in the memory 105 and start the encoding of the data (S902). The signal processing unit 104 stores the encoded data into the memory 105 (S903). Subsequently, the control unit 102 discriminates whether or not the recording stop instruction is received from the UI 103 (S904).

If the recording stop instruction is not received, the control unit 102 discriminates whether or not the file is opened on the recording medium designated as a recording destination (S913). For example, in a state where one of the recording mediums is selected and the recording start is instructed, the control unit 102 discriminates whether or not the file is opened on the selected recording medium detected in S901.

As a result of the discrimination, if the file is not generated yet, the control unit 102 generates the UUID (S914). The control unit 102 generates a new moving image file to the recording medium designated as a recording destination and adds the UUID to the moving image file (S915). At this time, if both of the two recording mediums are designated as recording destinations, a new file is generated on each recording medium and UUIDs having the same value are added to the moving image files. The control unit 102 instructs the recording medium control unit 106 to write the encoded data onto the file which is currently open (S916).

Subsequently, the control unit 102 compares the size of moving image file which is being recorded with the file division threshold value (S917). If the file size is equal to or larger than the file division threshold value, the control unit 102 closes all of the files which are currently open (S921) and the processing routine is returned to S902.

If the file size does not reach the file division threshold value, on the basis of the information of the recording space capacity from the recording medium control unit 106, the control unit 102 discriminates whether or not the recording space capacity of the recording medium designated as a recording destination is equal to or less than the recording stop threshold value (S918). For example, if the encoded data is simultaneously recorded onto the two recording mediums 108 and 109, the control unit 102 discriminates whether or not the recording space capacity of one of the recording mediums is equal to or less than the threshold value. If the recording space capacities of both of the recording mediums are larger than the threshold value, the control unit 102 discriminates whether or not the recording start has newly been instructed (S922).

In the present embodiment, while the moving image is being recorded onto one of the two recording mediums 108 and 109, the user can instruct the recording start of the moving image onto the other recording medium by operating the UI 103. For example, when the recording medium 108 is selected as a recording destination and the moving image is being recorded, if the recording start instruction is made, it is detected that the recording start instruction is newly made to the recording medium 109. If the recording start instruction is made while the encoded data is simultaneously recorded to the two recording mediums 108 and 109, this instruction is invalidated.

As mentioned above, if the recording start of the moving image onto the other recording medium is instructed by the user while the moving image is being recorded onto one of the two recording mediums 108 and 109, the control unit 102 detects the recording medium which is newly instructed to start the recording and newly designates it as a recording medium of the recording destination (S923). The moving image file which is being recorded at present is temporarily closed (S920). If there is no recording start instruction in S922, the processing routine is returned to S902 in order to continue the recording process as it is.

When the recording space capacity of one of the recording mediums is equal to or less than the threshold value in S918, the control unit 102 makes a judgment that the recording space capacity runs out, and detects the recording medium whose recording space capacity is equal to or less than the threshold value. The control unit 102 discriminates whether or not the encoded data is being recorded onto the recording medium other than the recording medium whose recording space capacity runs out (S919). If the encoded data is being recorded onto the other recording medium, the control unit 102 closes the moving image files which are being recorded onto both of the recording mediums (S920). The control unit 102 stops the recording of the moving image onto the recording medium whose recording space capacity runs out and the processing routine is returned to S902. Also after that, the recording of the encoded data onto the recording medium other than the recording medium whose recording space capacity is equal to or less than the threshold value is continued.

If the recording stop instruction is made in S904, the control unit 102 detects the recording medium which is instructed to stop the recording (S905). In the embodiment, during the simultaneous-recording of the moving images onto the two recording mediums 108 and 109, when the user instructs the recording stop by operating the UI 103, the control unit 102 displays the inquiry dialog screen for selecting the recording medium which is instructed to stop the recording onto the display unit 110. When the inquiry dialog screen is displayed onto the display unit 110, the user operates the UI 103 and selects the recording medium in which the recording is to be stopped.

As mentioned above, when the recording stop instruction is made, the control unit 102 discriminates whether or not the recording medium other than the recording medium which is instructed to stop the recording is designated as a recording destination (S906). If the other recording medium is designated as a recording destination, the processing routine advances to S924.

If the recording of the encoded data is stopped to the recording medium other than the recording medium which is instructed to stop the recording or if the encoded data is not recorded to the recording medium other than the recording medium whose recording space capacity is equal to or less than the threshold value in S919, the processing routine advances to S907. Subsequently, the control unit 102 stops the moving image data encoding which is executed by the signal processing unit 104 (S907). Subsequently, the control unit 102 discriminates whether or not the moving image file is opened (S908). If the moving image file is not opened, the control unit 102 generates the UUID (S909). The control unit 102 generates a new moving image file and adds the UUID to the moving image file (S910). A case where it is determined in S908 that the file is not opened is a case where after the recording is started, the recording stop instruction is received before an amount of encoded data stored in the memory 105 reaches the predetermined value. Another case where it is determined in S908 that the moving image file is not opened is a case where after the file which is being recorded is closed, the recording stop instruction is received before the amount of encoded data stored in the memory 105 reaches the predetermined amount.

As a result of the discrimination of S908, if the moving image file is opened, the control unit 102 instructs the recording medium control unit 106 to write the encoded data onto the moving image file which is opened at present (S911). In this instance, the encoded data is stored in the memory 105 in the time period until the recording stop instruction is received after the writing of the encoded data from the memory 105 is interrupted at the previous time. Therefore, the encoded data is read out of the memory 105 and written onto the recording medium 108 by the recording medium control unit 106. The file which is being recorded is closed and the recording is stopped (S912). The reproducing order is changed based on the management information (control information) so that a plurality of moving image files recorded in the time period from the recording start instruction to the recording stop instruction are reproduced in recording order thereof, and the management information is recorded onto the respective recording mediums.

If the moving image is being recorded onto the recording medium other than the recording medium which is instructed to stop the recording in S906, the control unit 102 discriminates whether or not the file to record the moving image data onto both of the recording mediums 108 and 109 is opened (S924). If the file is not opened, the control unit 102 generates the UUID (S925). A new file to record the encoded data is generated to both of the recording mediums 108 and 109 and the UUID is added to the moving image file (S926).

A case where it is determined in S924 that the file is not opened is a case where after the recording is started, the recording stop instruction is received before the amount of encoded data stored in the memory 105 reaches the predetermined value. Another case where it is determined in S924 that the moving image file is not opened is a case where after the file which is being recorded is closed in S920 and S921, the recording stop instruction is received before the amount of encoded data stored in the memory 105 reaches the predetermined amount.

As a result of the discrimination of S924, if the file is already opened, the encoded data is written into the file which is currently open by the recording medium control unit 106 (S927). In this instance, the encoded data is stored in the memory 105 in the time period until the recording stop instruction is received after the writing of the encoded data from the memory 105 is interrupted at the previous time. Therefore, the encoded data is read out of the memory 105 and written onto the recording mediums 108 and 109 by the recording medium control unit 106. All of the files which are being recorded are closed (S928) and the processing routine advances to S913. After that, the recording of the moving image is stopped to the recording medium which is instructed to stop the recording. By the processes of S924 to S928, while the moving images are simultaneously being recorded onto the two recording mediums 108 and 109, if the recording stop instruction is made to one of the recording mediums, the moving image files which are being recorded onto both of the recording mediums are closed in response to the recording stop instruction. After the moving image file which is being recorded onto the recording medium which is not instructed to stop the recording in S928 is closed, the processing routine advances to S913. A new moving image file is opened and the recording onto the recording medium which is not instructed to stop the recording is continued.

Figure 10:
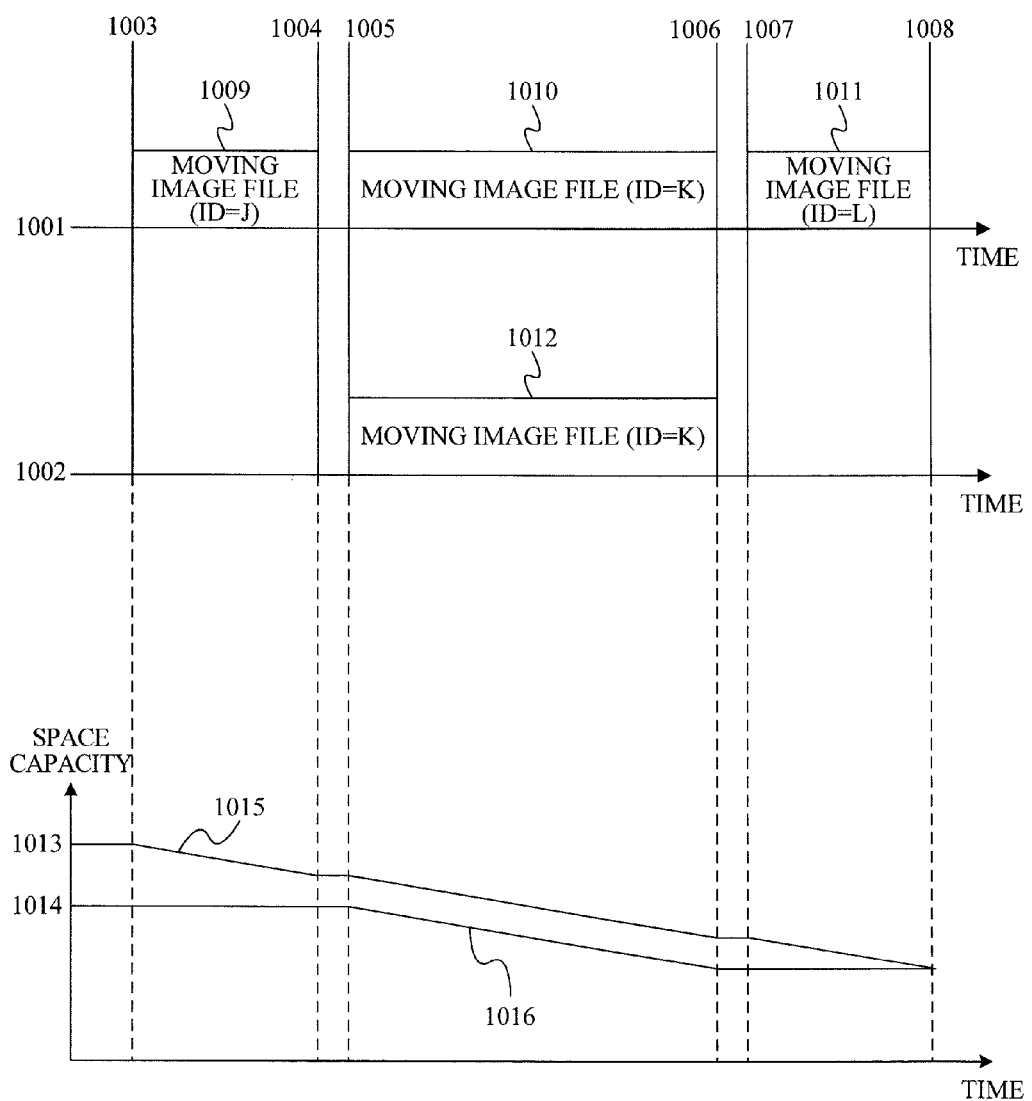
FIG. 10 is a diagram illustrating a relation between a status of each file recorded onto the recording medium and each recording space capacity in the simultaneous-recording process in FIG. 9.

FIG. 10 is a diagram illustrating a relation between the moving image files which are recorded in the simultaneous-recording mode in the fourth embodiment and the recording space capacity of each recording medium. A moving image file 1001 is a file which is recorded onto the recording medium 108. A moving image file 1002 is recorded onto the recording medium 109. When the recording medium 108 is designated as a recording medium of the recording destination and the recording start instruction is made at time 1003, a moving image file 1009 is generated and recorded onto the recording medium 108.

A UUID having a value J is added to the moving image file 1009. As mentioned above, the recording of the moving images is continued and when the recording start instruction to the recording medium 109 is newly made at time 1004, the moving image file 1009 is closed.

New moving image files 1010 and 1012 are generated at time 1005 and the moving image files 1010 and 1012 are recorded onto the respective recording mediums. UUIDs having a same value K are added to the moving image files 1010 and 1012. When the recording stop instruction to the recording medium 109 is made at time 1006, both of the moving image files 1010 and 1012 are closed and the recording of the data onto the recording medium 109 is stopped.

A moving image file 1011 is generated and recorded to the recording medium 108 at time 1007. A UUID having a value L is added to the moving image file 1011. In this manner, the recording of the moving images is continued and when the recording stop instruction is made at time 1008, the moving image file 1011 is closed and the recording is stopped.

Recording space capacities 1015 and 1016 of the recording mediums 108 and 109 are illustrated in FIG. 10. Before the recording is started, the recording space capacities of the recording mediums 108 and 109 are equal to values shown at 1013 and 1014. When the recording of the encoded data is started to the recording medium 108, each recording space capacity decreases gradually. When the recording start instruction to the recording medium 109 is made at time 1004, the recording space capacity of each recording medium also decreases gradually. When the recording stop instruction to the recording medium 109 is made at time 1006, since the recording onto the recording medium 109 is stopped after that, the recording space capacity does not change.

As mentioned above, in the embodiment, when the recording space capacity of one of the recording mediums runs out during the simultaneous-recording or when the recording stop instruction is made to one of the recording mediums, the moving image file which is being recorded onto each recording medium is closed. During the recording of the moving image to one of the recording mediums, when the recording to the other recording medium is started, the moving image file which is being recorded is closed. Therefore, the moving image files 1010 and 1020 which are simultaneously recorded are the files having the same contents. The same UUID is added to the two moving image files having the same contents and the obtained files are recorded.

Thus, it is guaranteed that the same moving image data is stored in the moving image files to which the same UUID is added. Therefore, it is unnecessary for the user to confirm whether or not the contents of the moving image files to which the same identification information is added are identical.

In the embodiment, when the recording is started, one of the recording mediums is designated as a recording destination and the recording stop instruction is made. However, the recording start may be simultaneously instructed to the two recording mediums.

Although the moving image data is simultaneously recorded to the two recording mediums in each of the foregoing embodiments, such a construction that the moving image data is recorded to a plurality of, that is, three or more recording mediums may be used.

Although the threshold value adapted to divide the file is set to the predetermined size in the embodiments, for example, the file may be divided each time the moving image data of a predetermined time is recorded. In this case, the threshold value is set as a predetermined recording time length. The control unit 102 generates a new file, counts an elapsed time from the recording start, and when the predetermined time elapses, outputs a file division instruction to the recording medium control unit 106. Although the embodiments are described with respect to the apparatus for recording the moving image data and audio data, the invention can be also similarly applied to an apparatus for recording other information data which is input.

Other Embodiments

Each unit constructing the recording apparatus and each step of the recording method in the foregoing embodiments of the invention can be realized by a method whereby a program stored in a RAM, a ROM, or the like of a computer operates. Such a program and a non-transitory computer-readable storing medium in which the program is stored are incorporated in the invention.

The invention can be also embodied as, for example, a system, an apparatus, a method, a program, a storing medium, or the like. Specifically speaking, the invention may be applied to a system constructed by a plurality of apparatuses or to an apparatus constructed by one equipment.

The invention also incorporates a case where a program (in the embodiments, program corresponding to the flowcharts illustrated in FIGS. 2, 5, 7, and 9) of software for realizing the functions of the embodiments mentioned above is directly supplied to the system or is supplied thereto from a remote place. The invention also incorporates a case where the functions of the embodiments mentioned above are accomplished by a method whereby a computer of the system or apparatus reads out a program code of the supplied program and executes them.

Therefore, the program code itself which is installed into the computer in order to realize the functions and processes of the invention by the computer also realizes the invention. In other words, the invention also incorporates the computer program itself to realize the functions and processes of the invention. In this case, the computer program may have any forms such as object code, program which is executed by an interpreter, script data which is supplied to the OS, or the like so long as it has functions of the program.

As a storing medium for supplying the program, for example, there is a flexible disk, a hard disk, an optical disk, a magnetooptic disk, or the like. Further, there is also an MO, a CD-ROM, a CD-R, a CD-RW, a magnetic tape, a non-volatile memory card, a ROM, a DVD (DVD-ROM, DVD-R), or the like.

As another program supplying method, there is a method of connecting to Homepage of the Internet by using a browser of a client computer. The computer program can be also supplied from the Homepage by a method whereby the computer program itself of the invention or a compressed file including an automatic installing function is downloaded to the storing medium such as a hard disk or the like.

The computer program can be also realized by a method whereby the program code constructing the program of the invention is divided into a plurality of files and the divided files are downloaded from different Homepages. In other words, a WWW server for allowing the program file for realizing the functions and processes of the invention by the computer to be downloaded to a plurality of users is also incorporated in the invention.

As another program supplying method, there is a method whereby the program of the invention is encrypted, stored into the storing medium such as a CD-ROM or the like, and distributed to the users, and the user who satisfies predetermined conditions is allowed to download key information adapted to decrypt the encryption from the Homepage through the Internet. The program supplying method can be also realized by a method whereby the encrypted program is executed by using such key information and installed into the computer.

The functions of the embodiments mentioned above are realized by a method whereby the computer executes the read-out program. Further, the functions of the embodiments mentioned above are also realized by a method whereby on the basis of instructions of the program, the OS or the like which is operating on the computer executes a part or all of actual processes and those functions are realized by such processes.

As still another program supplying method, there is a method whereby the program read out of the storing medium is first written into a memory provided for a function expanding board inserted in the computer or for a function expanding unit connected to the computer. The functions of the embodiments mentioned above are realized by a method whereby on the basis of instructions of the program, a CPU or the like which is provided for the function expanding board or function expanding unit executes a part or all of the actual processes and those functions are realized by such processes.

While the present invention is described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-176237, filed on Aug. 5, 2010, which is hereby incorporated by reference herein in its entirety.

What is claimed is:

1. A recording apparatus comprising:
an obtaining unit configured to obtain moving image data;
a recording unit configured to record the moving image data obtained by the obtaining unit as moving image files onto a plurality of recording media, wherein the recording unit is arranged to simultaneously record the moving image data onto the plurality of recording media;
a control unit configured to control the recording unit in such a manner that the recording unit simultaneously records the moving image files each including the moving image data obtained by the obtaining unit onto the plurality of recording media,
wherein the control unit controls the recording unit, in accordance with a recording space capacity of one recording medium of the plurality of recording media onto which the moving image data files are simultaneously recorded being smaller than a predetermined value, so as to simultaneously close the moving image files which are being recorded onto each of the one recording medium and a recording medium other than the one recording medium.

2. An apparatus according to claim 1, wherein the control unit controls the recording unit, in accordance with the recording space capacity of one recording medium of the plurality of recording media being smaller than the predetermined value, to stop the recording of the moving image data on each recording medium of plurality of recording media.

3. An apparatus according to claim 1, wherein the control unit controls the recording unit, in accordance with the recording space capacity of one recording medium of the plurality of recording media being smaller than the predetermined value, to close each of the moving image files which are being recorded onto each of the plurality of recording media, thereafter, stop the recording of the moving image data on the one recording medium, generate a new moving image file on the recording medium other than the one recording medium, and continue the recording.

4. An apparatus according to claim 1, further comprising:
a generating unit configured to generate identification information of the moving image file, the recording unit adds the identification information having the same value to the plurality of moving image files simultaneously recorded onto the plurality of recording media.

5. An apparatus according to claim 1, further comprising a moving image data generating unit configured to generate the moving image data.

6. A control method of a recording apparatus having an obtaining unit configured to obtain moving image data and a recording unit configured to record the moving image data obtained by the obtaining unit as moving image files onto a plurality of recording media, wherein the recording unit is arranged to simultaneously record the moving image data onto the plurality of recording media, comprising:
controlling the recording unit in such a manner that the recording unit simultaneously records the moving image files each including the moving image data obtained by the obtaining unit onto the plurality of recording media,
wherein the control step includes controlling the recording unit, in accordance with a recording space capacity of one recording medium of the plurality of recording media onto which the moving image data files are simultaneously recorded being smaller than a predetermined value, so as to simultaneously close the moving image files which are being recorded onto each of the one recording medium and a recording medium other than the one recording medium.

7. A non-transitory computer-readable recording medium storing a program for causing a computer function in a control method of a recording apparatus having an obtaining unit configured to obtain moving image data and a recording unit configured to record the moving image data obtained by the obtaining unit as moving image files onto a plurality of recording media, wherein the recording unit is arranged to simultaneously record the moving image data onto the plurality of recording media, as:
a control unit configured to control the recording unit in such a manner that the recording unit simultaneously records the moving image files each including the moving image data obtained by the obtaining unit onto the plurality of recording media, the control unit controlling the recording unit, in accordance with a recording space capacity of one recording medium of the plurality of recording media onto which the moving image data files are simultaneously recorded being smaller than a predetermined value, so as to simultaneously close the moving image files which are being recorded onto each of the one recording medium and a recording medium other than the one recording medium.

* * * * *